United States Patent [19]
Ho

[11] Patent Number: 5,593,219
[45] Date of Patent: Jan. 14, 1997

[54] MAINFRAME HOUSING OF A PERSONAL COMPUTER

[76] Inventor: Hsin C. Ho, 20F-1, 268, Sec. 1, Wen-Hua Road, Pan Chiao City, Taipei, Taiwan

[21] Appl. No.: 572,564

[22] Filed: Dec. 14, 1995

[51] Int. Cl.$^6$ ................................................. A47B 47/00
[52] U.S. Cl. .................. 312/263; 312/223.1; 312/265.5; 361/683; 361/724; 220/4.02
[58] Field of Search .................................. 361/683, 724, 361/725, 726, 727; 220/4.02, 4.28; 312/223.1, 223.2, 263, 265.5, 265.6, 257.1, 265.2, 265.3, 265.4

[56] References Cited

U.S. PATENT DOCUMENTS

| | | | |
|---|---|---|---|
| 3,672,531 | 6/1972 | Balven | 220/4.28 |
| 4,560,079 | 12/1984 | Eddleston et al. | 220/4.02 |
| 5,031,070 | 7/1991 | Hsu | 361/683 |
| 5,364,178 | 11/1994 | Hofman et al. | 312/263 |
| 5,397,176 | 3/1995 | Allen et al. | 312/265.6 X |
| 5,441,337 | 8/1995 | Mazura et al. | 312/265.5 X |

Primary Examiner—Peter M. Cuomo
Assistant Examiner—Janet M. Wilkens
Attorney, Agent, or Firm—Pro-Techtor International

[57] ABSTRACT

A computer mainframe housing including a rectangular metal base frame, a front panel and two rectangular cover panels and at least one square cover panels respectively covered on the base frame, wherein each of two opposite rectangular sides of the base frame has two rows of lugs longitudinally and bilaterally disposed along the border, a retaining hole near one end, rows of hooks longitudinally disposed between the rows of lugs, and one row of sliding slots longitudinally disposed between one row of lugs and the rows of hooks; each rectangular cover panel has a front flange forced into engagement with the front panel, longitudinally grooved reinforcing ribs at an inner side, a plurality of crossed tenons respectively disposed in the longitudinally grooved reinforcing ribs and forced into the sliding slots of one rectangular side of the base frame, a rear finger strip, a hook raised from the rear finger strip and forced into engagement with one retaining hole of the base frame; each square cover panel has two rows of inward hooks respectively forced into engagement with the lugs of the base frame, a finger strip, and a hook raised from the finger strip and forced into engagement with a respective retaining hole on the base frame.

4 Claims, 4 Drawing Sheets 5,593,219

MAINFRAME HOUSING OF A PERSONAL COMPUTER

BACKGROUND OF THE INVENTION

A personal computer generally comprises a PC board, a power supply unit, a cooling fan, a floppy diskdrive, a hard diskdrive, a speaker, and a plurality of card guides. For supporting these parts inside the personal computer, a metal frame is commonly used and then covered with a cover shell. This metal frame has holes and lugs for mounting. The housing of the personal computer is generally comprised of a substantially U-shaped cover shell covered on the metal frame, and a front panel secured to the cover shell. This U-shaped cover shell can be injection-molded from plastics or made from metal by stamping, however it cannot be used for both the horizontal computer and the vertical computer. Therefore, different cover shells shall be used for different types of computers. If the cover shell of a personal computer is injection-molded from plastics, the molding cost is expensive. If the cover shell of a personal computer is made from metal by stamping, it can only have a paint-coated smooth outer surface, which does not attract consumers. Furthermore, if a metal cover shell is used, many screws shall be used to fix it to the metal frame. This complicated installation procedure greatly consumes much labor. Nowadays, plastic housings are commonly used for personal computers. These plastic housings are commonly comprised of a plurality of panels assembled together. However, because these panels are fastened together by screws, the assembly process still consumes much labor.

SUMMARY OF THE INVENTION

The present invention has been accomplished to provide a mainframe housing for computers which eliminates the aforesaid drawbacks. It is the major object of the present invention to provide a mainframe housing for computers which can be quickly and detachably assembled without the use of any screw. According to the present invention, the computer mainframe housing comprises a rectangular metal base frame, a front panel and two rectangular cover panels and at least one square cover panels respectively covered on the base frame, wherein each of two opposite rectangular sides of the base frame has two rows of lugs longitudinally and bilaterally disposed along the border, a retaining hole near one end, rows of hooks longitudinally disposed between the rows of lugs, and one row of sliding slots longitudinally disposed between one row of lugs and the rows of hooks; each rectangular cover panel has a front flange forced into engagement with the front panel, rows of crossed tenons respectively forced into the sliding slots of one rectangular side of the base frame, a rear finger strip, a hook raised from the rear finger strip and forced into engagement with one retaining hole of the base frame; each square cover panel has two rows of inward hooks respectively forced into engagement with the lugs of the base frame, a finger strip, and a hook raised from the finger strip and forced into engagement with a respective retaining hole on the base frame.

DETAILED DESCRIPTION OF THE PREFERRED EMBODIMENT

Referring to the annexed drawings in detail, the base frame, referenced by 1, is made from metal of rectangular shape, having two opposite square sides and four rectangular sides connected between the two opposite square sides. One of the square sides is an open side. The other of the square sides is a close side. When the base frame 1 is designed for a vertical personal computer, the two square sides serve as the left side and the right side of the personal computer. When the base frame 1 is designed for a horizontal personal computer, the two square sides serve as the top side and the bottom side. Either designed for a horizontal personal computer or a vertical personal computer, the front side of the base frame 1 is covered with a front panel 6.

Figure 1:
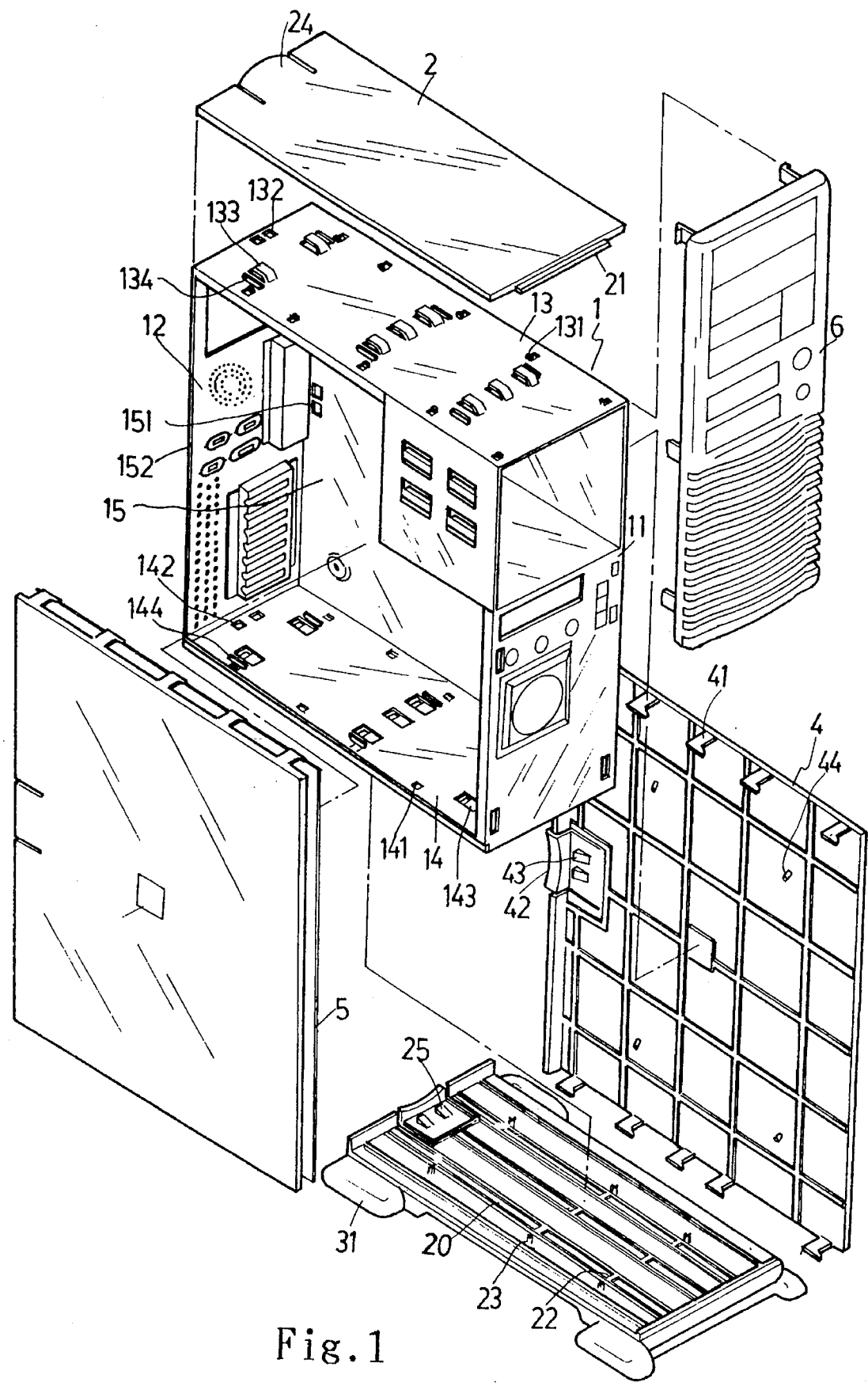
FIG. 1 is an exploded view of a mainframe housing for a vertical personal computer according to the present invention.
Figure 2:
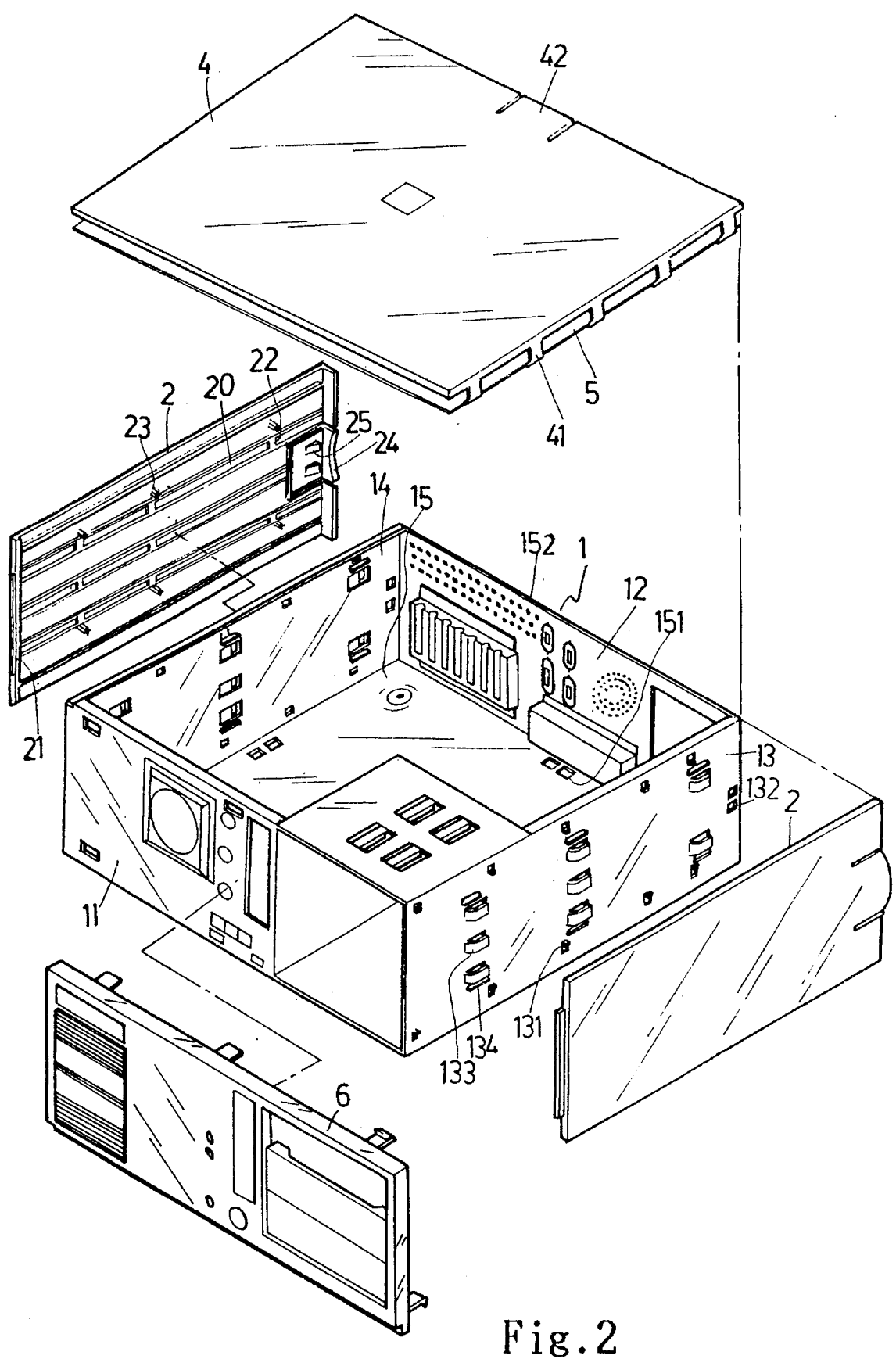
FIG. 2 is an exploded view of a mainframe housing for a horizontal personal computer according to the present invention.
Figure 3:
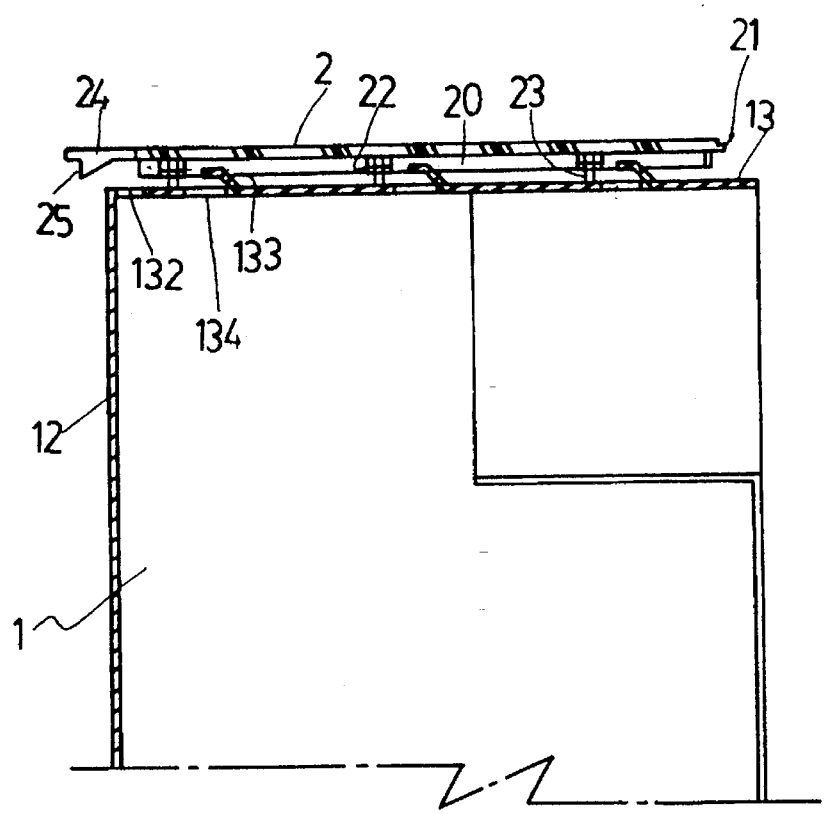
FIG. 3 shows the position of the top panel of the mainframe housing of FIG. 1 relative to the base frame.
Figure 4:
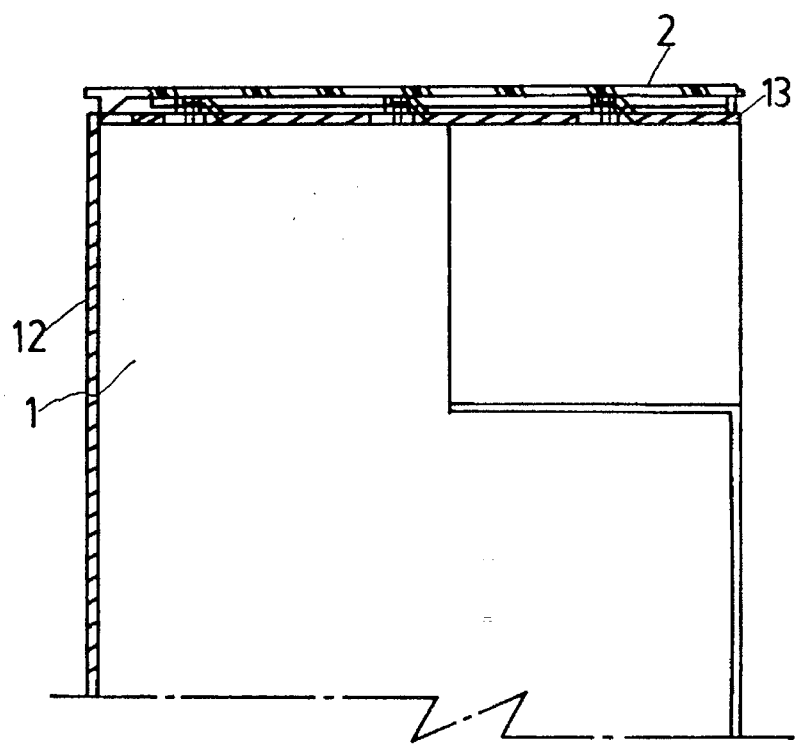
FIG. 4 is similar to FIG. 3 but showing the top panel secured to the base frame.
Figure 5:
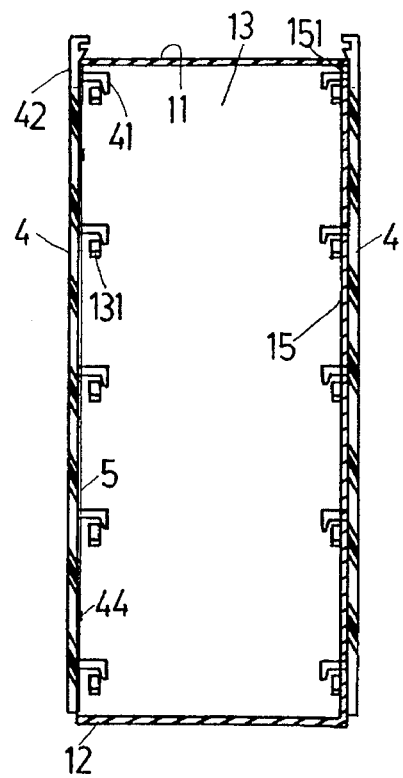
FIG. 5 shows the position of the side panel of the mainframe housing of FIG. 1 relative to the base frame.
Figure 6:
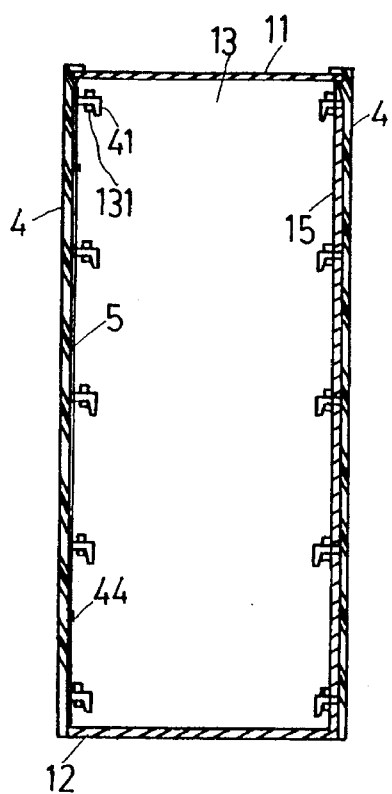
FIG. 6 is similar to FIG. 5 but showing the side panel secured to the base frame.

Referring to FIG. 1, the base frame 1 has four rectangular sides 11, 12, 13, and 14. Except the front side 11 and the back side 12, each of the other two rectangular sides 13 and 14 comprises two rows of lugs 131 or 141 longitudinally and bilaterally disposed along the border, a hole 132 or 142 near one end, rows of hooks 133 or 143 longitudinally disposed between the lugs 131 or 141, and one row of sliding slots 134 or 144 longitudinally disposed between one row of lugs 131 or 141 and the rows of hooks 133 or 143. Two rectangular cover panels 2 are respectively fastened to the rectangular sides 13 and 14. Each of the rectangular cover panels 2 comprises a front flange 21, rows of longitudinally grooved reinforcing ribs 20, a plurality of retaining holes 22 on the longitudinally grooved reinforcing ribs 20 for connection to the rows of hooks 133 or 143, rows of crossed tenons 23 for fastening to the sliding slots 134 or 144, a rear finger strip 24, and a hook 25 raised from the bottom side of the rear finger strip 24 for fastening to the hole 132 or 142. Furthermore, one of the rectangular cover panels 2 has legs 31 for supporting the housing of the personal computer on the table or the like. The legs 31 are eliminated if base frame 1 is designed for a horizontal personal computer (see FIG. 2). Two square cover panels 4 are fastened to the two opposite square sides of the base frame 1. The close square side 15 of the base frame 1 comprises a hole 151 near the back side of the personal computer. Each of the square cover panels 4 comprises two rows of inward hooks 41 for fastening to the lugs 131 and 141 of the base frame 1, a finger strip 42, and a hook 43 raised from the finger strip 42 for fastening to the hole 151. If the base frame 1 is designed for a vertical computer, two square cover panels 4 are used and covered on the two opposite square sides of the base frame 1. If the base frame 1 is designed for a horizontal computer, only one square cover panel 4 is needed. If one square cover panel 4 is used for covering the square open side of the base frame 1, it must be attached with a metal sheet 5 on the inside (see FIG. 1) to eliminate the leakage of electromagnetic waves. For mounting the metal sheet 5, the square cover panel 4 is made having a plurality of mounting rods 44. When the mounting rods 44 are respectively fitted into respective holes (not shown) on the base frame 1, they are fixedly secured to the base frame 1 by welding.

During the assembly process, the front panel 6 is firstly secured to the base frame 1, then the rectangular cover panels 2 and the square cover panels 4 are respectively fastened to the base frame 1. It is preferably to fasten the square cover panels 4 to the base frame 1 before the installation of the rectangular cover panels 2. By hooking the hooks 41 on the lugs 131 and 141 and hooking the hooks 43 on the hole 151 or the border 152 of the base frame 1, the square cover panels 4 are fixed to the base frame 1. By inserting the crossed tenons 23 into the sliding slots 134 and 144, then fastening the retaining holes 22 of the longitudinally grooved reinforcing ribs 20 to the rows of hooks 133 and 143 and hooking the hooks 25 in the holes 132 and 142 respectively, the rectangular cover panels 2 are fixed to the base frame. When the rectangular cover panels 2 are fixed to the base frame 1, the front flanges 21 of the rectangular cover panels 2 are respectively forced into engagement with the front panel 6.

It is to be understood that the drawings are designed for purposes of illustration only, and are not intended as a definition of the limits and scope of the invention disclosed.

I claim:

1. A mainframe housing comprising a rectangular metal base frame having two opposite square sides and two pairs of opposite rectangular sides with borders connected between the square sides, a front panel covered on one rectangular side of said base frame, two rectangular cover panels fastened to two opposite rectangular sides of said base frame, and at least one square cover panel respectively covered on the square sides of said base frame, wherein: one pair of the two pairs of opposite rectangular sides of said base frame comprises two rows of lugs longitudinally and bilaterally disposed along the border, a retaining hole near one end, rows of hooks longitudinally disposed between said rows of lugs, and one row of sliding slots longitudinally disposed between one row of lugs and said rows of hooks; each rectangular cover panel comprises a front flange forced into engagement with said front panel, a plurality of longitudinally grooved reinforcing ribs at an inner side, a plurality of rows of crossed tenons respectively respectively disposed in said longitudinally grooved reinforcing ribs and respectively forced into the sliding slots of one rectangular side of said base frame, a rear finger strip, and a hook raised from said rear finger strip and forced into engagement with one retaining hole of said base frame; each square cover panel comprises two rows of inward hooks respectively forced into engagement with the lugs of said base frame, a finger strip, and a hook raised from the finger strip and forced into engagement with a respective retaining hole on said base frame.

2. The mainframe housing of claim 1 wherein one of said rectangular cover panels has legs for supporting the mainframe housing on a flat working surface.

3. The mainframe housing of claim 1 wherein said at least one square cover panel comprises one square cover panel covered with a metal sheet on the inside and fastened to one square open side of said base frame.

4. The mainframe housing of claim 3 wherein the square cover panel has a plurality of mounting rods.

* * * * *